United States Patent
Allfrey et al.

(10) Patent No.: US 10,521,569 B2
(45) Date of Patent: Dec. 31, 2019

(54) METHOD AND APPARATUS FOR AUTOMATIC LICENSE CONFIGURATION UPDATES

(71) Applicant: FLEXERA SOFTWARE LLC, Itasca, IL (US)

(72) Inventors: Peter Allfrey, Box Hill (AU); Matt Marnell, Boulder, CO (US); David Swann, Box Hill (AU)

(73) Assignee: Flexera Software LLC, Itasca, IL (US)

( * ) Notice: Subject to any disclaimer, the term of this patent is extended or adjusted under 35 U.S.C. 154(b) by 297 days.

(21) Appl. No.: 14/676,441

(22) Filed: Apr. 1, 2015

(65) Prior Publication Data

US 2016/0292397 A1 Oct. 6, 2016

(51) Int. Cl.
*G06F 21/10* (2013.01)
*G06Q 30/00* (2012.01)

(52) U.S. Cl.
CPC ......... *G06F 21/105* (2013.01); *G06Q 30/018* (2013.01); *G06F 2221/0768* (2013.01)

(58) Field of Classification Search
CPC .......... G06F 21/105; G06F 2221/0768; G06Q 30/018
USPC ......................................................... 705/59
See application file for complete search history.

(56) References Cited

U.S. PATENT DOCUMENTS

| | | | | |
|---|---|---|---|---|
| 8,229,858 B1 * | 7/2012 | Mazza | ..................... | G06F 21/10 705/51 |
| 2005/0177716 A1 * | 8/2005 | Ginter | ..................... | G06F 21/10 713/157 |
| 2008/0256349 A1 * | 10/2008 | Dennis | .................. | G06F 21/121 713/1 |
| 2009/0077667 A1 * | 3/2009 | Van Rijnsoever | ...... | G06F 21/10 726/26 |
| 2009/0205040 A1 * | 8/2009 | Zunke | ....................... | G06F 8/65 726/14 |
| 2009/0249494 A1 * | 10/2009 | Disciascio | .............. | G06F 21/10 726/31 |
| 2010/0205303 A1 * | 8/2010 | Chaturvedi | ............. | G06F 21/10 709/226 |
| 2010/0325427 A1 * | 12/2010 | Ekberg | .................... | H04L 9/321 713/156 |
| 2010/0333212 A1 * | 12/2010 | Carpenter | ............... | G06F 21/10 726/29 |
| 2012/0084393 A1 * | 4/2012 | Williams | .................. | G06F 8/61 709/217 |

(Continued)

*Primary Examiner* — James D Nigh
(74) *Attorney, Agent, or Firm* — Knobbe, Martens, Olson & Bear, LLP

(57) ABSTRACT

A license update engine is run as part of a license entitlement automation system. The license update engine is minimally executed daily and identifies, for example, content updates to be applied and licenses that have drifted from their definition. The license update engine then generates proposals for operators to consider. Accepted proposals update the license configuration. Thus, the license update engine identifies licenses and the definitions that are connected to them, including definitions that the licenses from which the were created and definitions that are linked to SKUs of entitlement purchases. Analyses relates three categories of proposal, including license types, applications linked to licenses, and usage rights on licenses. Proposals are stored in a database and operators can accept or ignore them. The database maintains a history of license changes.

12 Claims, 5 Drawing Sheets

(56) References Cited

U.S. PATENT DOCUMENTS

2014/0215303 A1\* 7/2014 Grigorovitch ........ G06F 16/972
 715/229
2014/0250537 A1\* 9/2014 Siris ............................... 726/28

\* cited by examiner

METHOD AND APPARATUS FOR AUTOMATIC LICENSE CONFIGURATION UPDATES

FIELD

The invention relates to software rights management. More particularly, the invention relates to a method and apparatus for automatic license configuration updates.

BACKGROUND

Licenses in, for example, the FlexNet Manager Suite (Flexera Software, Itasca, Ill.) are created based on a definition. Over time that definition changes, or other definitions related to other purchases are associated with the license. Operators can also manually change the license such that it does not match the original terms of the license definition.

Most licenses, for example in a typical FlexNet Manager Suite, are created using license definitions that are supplied via content libraries. These content libraries contain definitions of license properties, such as name, version, etc.; applications to link to the license; and usage rights to be set on the license. Once a license is created, it is then static and does not pick up any changes as the data is updated and extended over time. Thus, the licenses are configured from the definition at the time of creation and are not updated as the definition evolves over time. Changes to the definition are often due to, for example, changes to the licensing terms and conditions. Uncorrected, this results in reduced accuracy and optimization value to customers.

Further, it is not desirable to let the licenses pass settings through from the definition, in effect inheriting them from the definition, because customers may have negotiated their own terms. It is therefore necessary to at least inform the customers and not just make changes that could cause the customer's license position to change drastically. For example a customer may wish to change the SKU they are purchasing if a publisher turns off a second use feature on the SKU they were purchasing.

SUMMARY

Embodiments of the invention provide a license update engine that is run as part of a license entitlement automation system. In embodiments of the invention, the license update engine is minimally executed daily and identifies, for example, content updates to be applied and licenses that have drifted from their original definition. The license update engine then generates proposals for operators to consider. Accepted proposals update the license configuration. Thus, the license update engine identifies licenses and the definitions that are connected to them, including definitions for the licenses from which they were created and definitions that are linked to SKUs of entitlement purchases. Analyses relate three categories of proposal, including license types, applications linked to licenses, and usage rights on licenses. Proposals are stored in a database and operators can accept or ignore them. The database then maintains a history of the license changes.

In an embodiment of the invention, the license update engine regularly analyses licenses which have been created from, and that are associated to, definitions and highlights differences between the current license settings and the latest reference definitions. As noted above, these differences can then either be accepted to bring the license in line with the reference definition, or they can be ignored, leaving the license in its current state. The license update engine thus compares licenses that have been created from definitions to the latest versions of those definitions and generates proposals that permit an operator to update their license definitions.

DRAWINGS

DESCRIPTION

Figure 1:
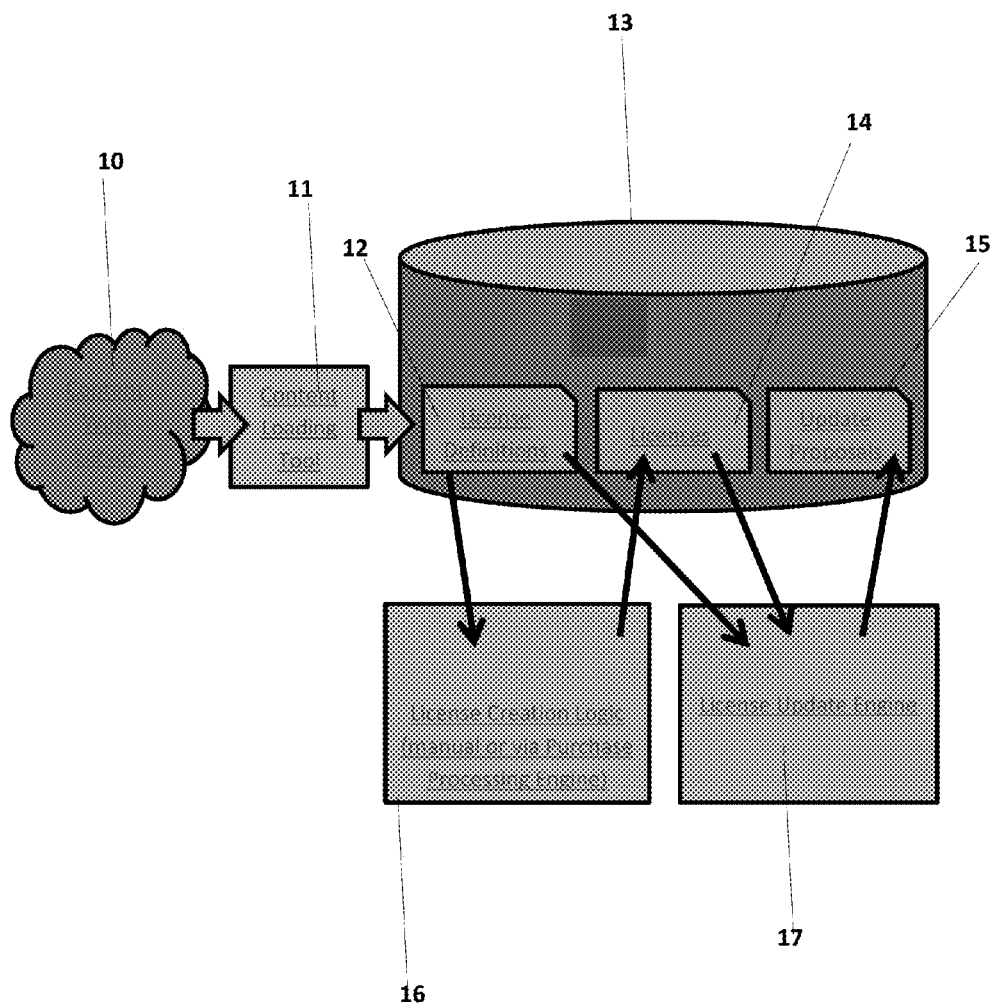
FIG. 1 is a block schematic diagram showing a system architecture for automatic license updates according to the invention.

Embodiments of the invention provide a license update engine that is run as part of a license entitlement automation system. In embodiments of the invention, the license update engine is minimally executed daily and identifies, for example, content updates to be applied and licenses that have drifted from their definition. The license update engine then generates proposals for operators to consider. Accepted proposals update the license configuration. Thus, the license update engine identifies licenses and the definitions that are connected to them, including definitions that the licenses from which the were created and definitions that are linked to SKUs of entitlement purchases. An analysis produced by the license update engine relates to, for example, three categories of proposal, including license types, applications linked to licenses, and usage rights on licenses. Proposals are stored in a database and operators can accept or ignore them. The database maintains a history of the license changes.

Glossary

In embodiments of the invention, the following terms have their associated meanings:

Content libraries: Archived collections of application, SKU, and license definitions. The content data is downloaded and stored in the product database. Customers receive regular, e.g. monthly, updates to these content libraries in the product database for as long as the customer has a current maintenance agreement. Embodiments of the invention are principally concerned with the license definitions in the content libraries and their use by the product. Definitions of purchasable SKUs from software publishers are linked to license definitions that define the license entitlements that were purchased.

License definition: A template defining attributes and properties of a license entitlement from a software publisher. The license definition includes basic properties, such as license type, name, version and publisher; applications that are covered by the license; and use rights that this license grants. The template is used to instantiate licenses.

License: An instance created from a license definition that represents a quantity of entitlements, from purchases associated with the license, for the installation and use of applications subject to a set of use rights.

Use right: A term in a license which affects how applications are entitled to be installed and/or used. Example of use rights include, for example:

Right of second use, i.e. the ability to have installs on a desktop and a mobile computer owned by the same user count as one install;

Right of multiple use, i.e. the ability to have all installs of an application on the same device and/or multiple devices count as one install; and Virtualization rights, i.e. whether the application is licensed per virtual machine or per host for many virtual machines.

License update engine: Logic that identifies definitions associated to licenses and that then compares those licenses with their definitions to determine the accuracy of the license. The license update engine is automatically run regularly as part of a batch process to generate proposals in a timely fashion for operators. Operators can also manually initiate the license update engine for a selected set of licenses to recalculate the proposals for those licenses. The license update engine can also accept the proposals and modify the state of licenses.

Proposal: A recommendation to change a setting or property of a license to match its reference definition, as defined by the content libraries, better. The proposal is relative to the reference definition for the license. The impact on the license position is not presented as part of the proposal.

Accept: The act of an operator choosing to act upon a proposal. This updates the properties and/or settings of a license to match those of a definition. To see the effects of the update to the license configuration on the license position, a license reconcile process is run to re-optimize the license position.

Ignore: The act of an operator choosing to ignore a proposal. This means that the proposal is no longer shown in the list of active proposals visible to operators. This is typically only done in situations where a specific set of terms have been negotiated with a software publisher that are different from the normal license terms.

Operation

FIG. 1 is a block schematic diagram showing a system architecture for automatic license updates according to the invention. In embodiments of the invention, the process begins with the creation of a license from a definition in the content libraries. This can be achieved via either the straight creation of a license from a template (definition) or via a definition derived from a SKU associated with a purchase. The set of definitions associated with a particular license can be further augmented by including all definitions associated with SKUs of purchases providing entitlements to the license.

For example, the FlexNet Manager Suite product is one context within which an embodiment of this invention can exist. To provide additional context of the product and how the invention sits within that context, a brief summary of the product follows.

FlexNet Manager Suite takes in data from a variety of an enterprise's data sources and processes this data to arrive at a license position for that enterprise. The first source of data is an inventory of an enterprise's computers, covering both hardware and software. This inventory data is stored in a database associated with the product.

The other source of data is the purchasing data that records an enterprise's purchases of products supplied by software publishers. These purchases are typically made via stock keeping units (SKUs) which are the publisher's definition of what has been purchased. The purchase data is stored in a database associated with the product.

FlexNet Manager Suite converts these purchases to licenses via knowledge of publisher SKUs contained in the content libraries. The content libraries contain definitions of SKUs, each of which has an associated license definition. From these, the FlexNet Manager Suite can create licenses from purchases of SKUs and link purchases of SKUs to existing licenses that match the definition.

These content libraries are regularly updated on the Flexera Software website by Flexera Software staff who monitor the accuracy of the content library data against the SKUs and associated license definitions of software publishers. The content libraries are downloaded by the product into the associated database. The licenses created from purchases are also stored in the same database.

The update engine accesses the licenses from the database, determines the set of license definitions associated with the licenses, and then confirms whether each license matches the one or more definitions associated with it. This is the task performed by the update engine discussed in connection with embodiments of the invention. The proposals generated are also stored in tables in the associated product database.

Once FlexNet Manager Suite has inventory data and license data, there is a regularly scheduled job which compares the two to arrive at a license position. The comparison involves finding the most optimal consumption of the purchased license entitlements by installed instances of software products following the use right rules defined by the purchased license entitlements. The inventive update engine herein disclosed is employed during one phase of this regularly scheduled job.

In FIG. 1, a content Web server 10 is in communication with a content loading tool 11. The content loading tool fetches content from the content Web server and stores the content in a database 13. The database contains license definitions 12, licenses 14, and update proposals 15. Licenses are created from license definitions by license creation logic 16. The license creation logic may be implemented by either a manual operation or an automated process, such as via a purchase processing engine.

This existing functionality provides a set of definitions to compare against the current license. Iterating over each license it can then compare the current state of the license against each of the definitions identified for the licensed product. The license update engine 17 thus polls license definitions and licenses and, based on determined differences, generates license update proposals.

In embodiments of the invention, the license update engine performs comparisons in three categories (although the invention may be used with any number of categories):

1. The type of the license;
2. The usage rights set on the license, which covers all use rights which can be set by the content libraries; and
3. Applications linked to the license.

From these comparisons, proposals are generated to highlight to operators what they should consider updating on their licenses.

Figure 2:
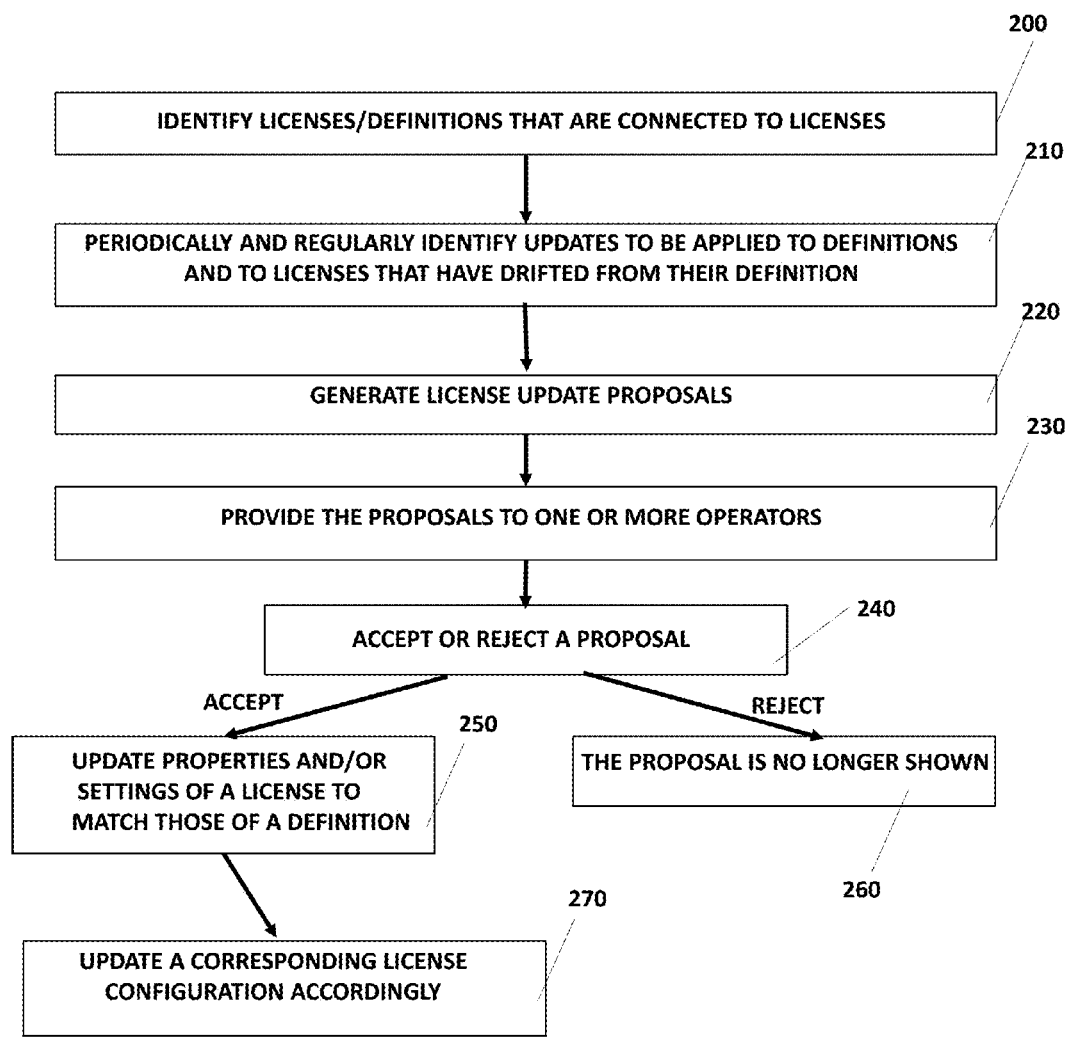
FIG. 2 is a flow diagram showing a technique for automatic license updates according to the invention.

FIG. 2 is a flow diagram showing a technique for automatic license updates according to the invention. In FIG. 2, a license update engine identifies licenses and definitions that are connected to the licenses (200). The license update engine periodically and regularly identifies updates to be applied to the definitions and to licenses that have drifted from their definition (210). Responsive to this identification, the license update engine generates one or more license update proposals (220). These proposals comprise one or more recommendations to change a setting or property of a license to match its reference definition better. Each proposal is relative to a reference definition for the license. The license update engine then provides the proposals to one or more operators (230). The license update engine receives a decision to accept or ignore the one or more proposals from the one or more operators (240). A decision to accept a proposal updates properties and/or settings of a license to match those of a definition (250), whereas if there is a decision to ignore a proposal, then the rejected proposal is no longer shown in a list of active proposals (260). The license update engine, upon receiving acceptance of one or more proposals, then updates a corresponding license configuration accordingly (270).

Figure 3:
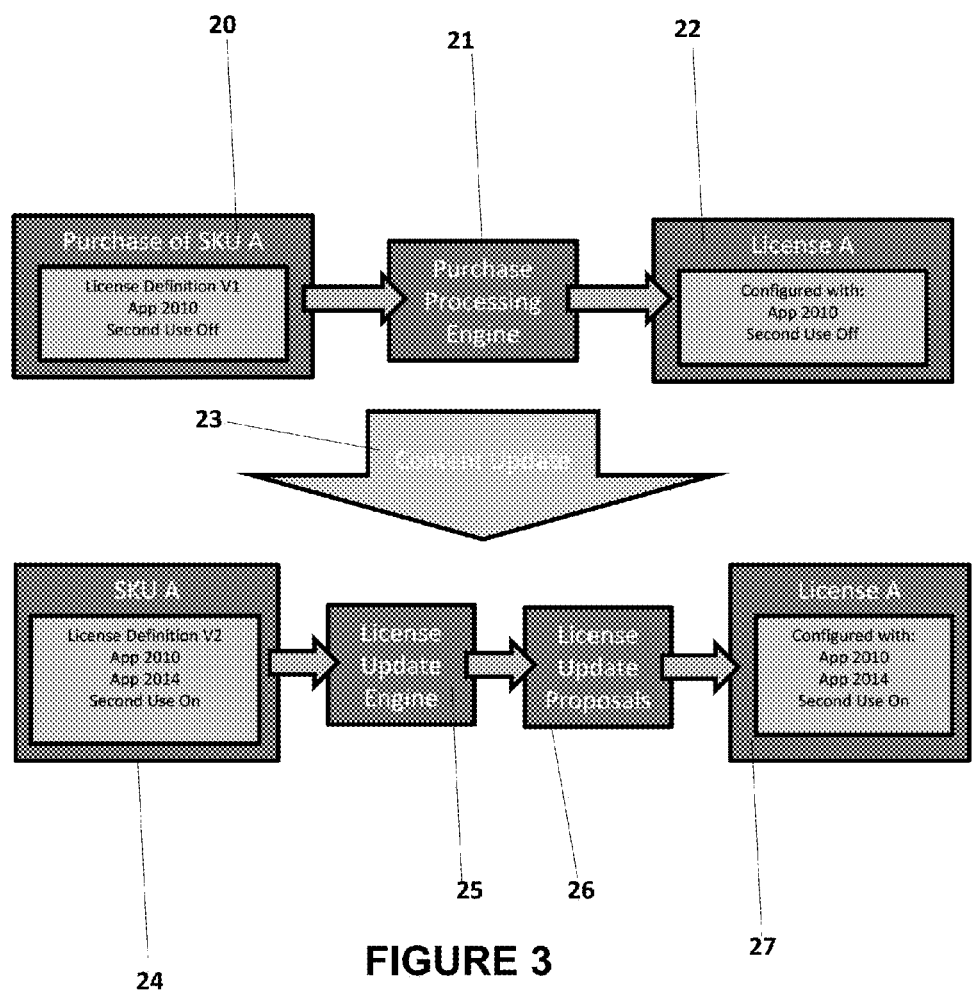
FIG. 3 is a block schematic diagram showing an example of operation of a license update engine according to the invention.

FIG. 3 is a block schematic diagram showing an example of operation of a license update engine according to the invention. In embodiments of the invention, there are two main scenarios to be handled:

1. A definition is updated after the creation of a license from that definition; and
2. A license is manually altered by an operator so that it no longer matches the definition.

The scenario of a definition updated within the content libraries after license creation has a flow as follows (this example shows a change to a use right, but the flow is the same for a change of license type or change of applications):
1. The operator, via the purchase processing engine (21), creates a license A (22) from definition A version 1 (20). In this example, version 1 of the definition has the "right of second use" disabled. Those skilled in the art will appreciate that any number of license features and rights may exist in any possible state.
2. Content libraries provide an updated definition A version 2 (24). Version 2 of the definition has the "right of second use" enabled.
3. For a content update (23), the license update engine (25) executes and:
Determines that license A was created from definition A;
Compares the "right of second use" value on license A to that on definition A; and
Generates a proposal (26) highlighting the change that should be made, i.e. turn on the right of second use.
4. The operator reviews the definition and decides to accept it.
5. The license update engine modifies the license according to the proposal.
6. The next execution of the license update engine now sees License A matching definition A (27).

The scenario of a license manually altered by an operator is shown by the following flow:
1. The operator creates a license A from definition A. The definition has the "right of second use" enabled.
2. The operator manually modifies license A and disables the right of second use.
3. The license update engine executes and:
Determines that license A was created from definition A;
Compares the "right of second use" value on license A to that on definition A; and
Generates a proposal highlighting the change that should be made, i.e. that the right of second use should be disabled.
4. The operator reviews the definition and decides to accept it.
5. The license update engine modifies the license according to the proposal.
6. The next execution of the license update engine now sees License A matching definition A.

Because a license is typically associated with multiple definitions, there is the possibility of conflicting proposals for the same license. For example, a license may be linked with two definitions, e.g. one for a purchase with software assurance, and one without software assurance. This would generate a proposal that the license should have upgrade rights enabled, assuming they were disabled on the license, but be noted as conflicting with another definition. Once a license has more than one definition associated with it, these conflicts are reported. This highlights to the operator that they need either to accept the clashing license settings or split the license into two and associate each definition with each license. Note that at the time of license creation there is only one definition and, as such, no conflicts exist at that time. Rather, conflicts can come into being as time passes and conditions change.

Proposals are automatically cleaned up when they are no longer relevant. They are also updated if they change. For example, the points consumed on the definition may change from 50 to 100 but the license has a value of 75 so there is now only one proposal to change it to 100.

There exist a plurality of separate properties that are populated into a license definition that trigger a different behavior in the licensed product, as well as custom features based in the product that address calculation issues and licensing issues for operators. The system monitors these behaviors and features as they exist in the license definitions and provides recommendations to the operators in the proposal.

Figure 4:
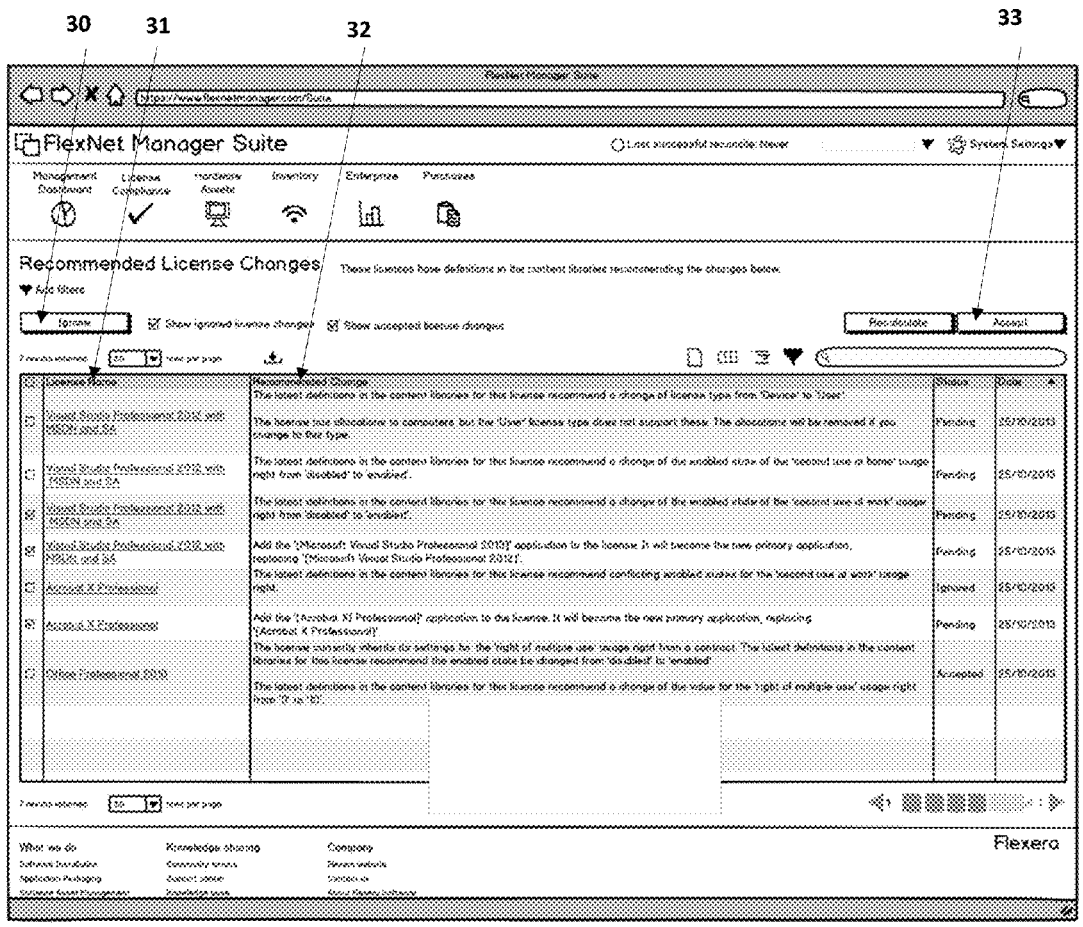
FIG. 4 is a screen shot showing a user interface for displaying a license update proposal according to the invention.

FIG. 4 is a screen shot showing a user interface for displaying a license update proposal according to the invention. In FIG. 4, each license it identified by its name 31 and the proposal listing recommended changes 32 is shown in connection with the listed license. Thus, for the licensed product Visual Studio Professional 2012 with MSDN and SA the system has identified that:

"[t]he license has allocations to computers, but the "User" license type does not support these. The allocations will be removed if you change to this type."

The operator, upon receiving the proposal, has the option to accept the proposal 33 or to ignore the proposal 30.

The license update engine thus looks at the licenses and the definitions that can be connected to them. This can be a definition from which a license was originally created or definitions linked to the SKU of purchases that have subsequently also been linked to that license. Thus, there can be multiple license definitions. In embodiments of the invention, there are three different proposals that are made: license types, applications linked to licenses, and usage rights on licenses.

For example, consider a license that is out of compliance. In this example, a license definition existed for Microsoft® Office® that was purchased at the time that Office 2010 was released. Along with the license, four years maintenance were purchased, thus entitling the purchaser to future versions of the product. Thus, when Office 2013 is released the system updates the license definition to replace Office 2010, such that the latest license definition now includes Office 2013. In this case, the license update engine detects the difference between the purchaser's existing license, based upon the license definition at the time the license was purchased and the current license definition, and recommends to the operator that they add Office 2013 to their license.

Further, definitions can conflict with each other, e.g. a customer has made two purchases of Office 2010 one with maintenance and one without maintenance. As well, second use is turned on for one license and turned off for the other license. If both of these purchases are linked to the same license, the customer is not getting the best value for their usage rights because either they have second use turned on for that license when they should not have it for half of the entitlement, or they have it turned off and they are not getting the benefit of that use right for half of the entitlement. In the proposals the license update engine highlights such conflicts as well, such that a proposal is made to the customer advising of the need to break the license out into two separate licenses.

If the operator accepts the proposal, the properties and/or settings of a license are updated to match those of the current definition. To see the effects of the update to the license configuration on the license position, a license reconcile process is run to re-optimize the license position. If the operator ignores a proposal, the proposal is no longer shown in the list of active proposals visible to operators. This is typically only done in situations where a specific set of terms have been negotiated with a software publisher that are different from the normal license terms. All proposals and operator choices are tracked in the database. The proposals remain visible to the operator until acted upon or they are removed by the license update engine because they are no longer relevant.

Computer Implementation

Figure 5:
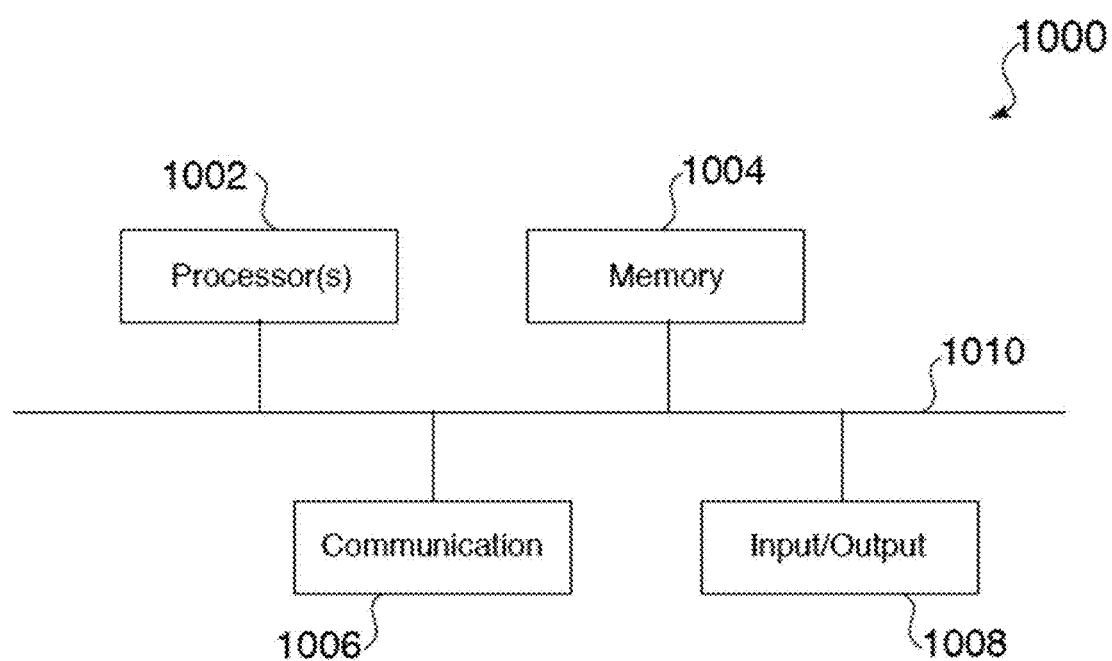
FIG. 5 is a block schematic diagram showing a machine in the example form of a computer system within which a set of instructions for causing the machine to perform one or more of the methodologies discussed herein may be executed.

FIG. 5 is a block diagram of a computer system that may be used to implement certain features of some of the embodiments of the invention. The computer system may be a server computer, a client computer, a personal computer (PC), a user device, a tablet PC, a laptop computer, a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, wearable device, or any machine capable of executing a set of instructions, sequential or otherwise, that specify actions to be taken by that machine.

The computing system 40 may include one or more central processing units ("processors") 45, memory 41, input/output devices 44, e.g. keyboard and pointing devices, touch devices, display devices, storage devices 42, e.g. disk drives, and network adapters 43, e.g. network interfaces, that are connected to an interconnect 46.

In FIG. 5, the interconnect is illustrated as an abstraction that represents any one or more separate physical buses, point-to-point connections, or both connected by appropriate bridges, adapters, or controllers. The interconnect, therefore, may include, for example a system bus, a peripheral component interconnect (PCI) bus or PCI-Express bus, a Hyper-Transport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also referred to as Firewire.

The memory 41 and storage devices 42 are computer-readable storage media that may store instructions that implement at least portions of the various embodiments of the invention. In addition, the data structures and message structures may be stored or transmitted via a data transmission medium, e.g. a signal on a communications link. Various communications links may be used, e.g. the Internet, a local area network, a wide area network, or a point-to-point dial-up connection. Thus, computer readable media can include computer-readable storage media, e.g. non-transitory media, and computer-readable transmission media.

The instructions stored in memory 41 can be implemented as software and/or firmware to program one or more processors to carry out the actions described above. In some embodiments of the invention, such software or firmware may be initially provided to the processing system 40 by downloading it from a remote system through the computing system, e.g. via the network adapter 43.

The various embodiments of the invention introduced herein can be implemented by, for example, programmable circuitry, e.g. one or more microprocessors, programmed with software and/or firmware, entirely in special-purpose hardwired, i.e. non-programmable, circuitry, or in a combination of such forms. Special-purpose hardwired circuitry may be in the form of, for example, one or more ASICs, PLDs, FPGAs, etc.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A computer implemented method to increase accuracy of automatic license updates, said method comprising:
providing a processor that is configured to operate as a license update engine, said processor implemented license update engine configured to communicate with a database comprising license definitions, licenses, and update proposals, said database configured to communicate with a web server;
said license update engine identifying said licenses and said license definitions that are connected to said licenses,
wherein a particular license is connected to a first license definition at a time associated with creation of the particular license, and wherein the particular license is subsequently connected to a second license definition;
said license update engine increasing accuracy of automatic license updates by periodically identifying updates to said definitions which should be applied to said licenses and to licenses that have drifted from their definition;
responsive to said identifying, said license update engine automatically generating one or more said license update proposals with regard to categories comprising license types, applications linked to licenses, and usage rights on licenses, where said proposals comprise one or more recommendations to change a setting or property associated with said categories to match its reference definition better, where each proposal is relative to a reference definition for the license,
wherein the license update engine determines a conflict between the first license definition and the second license definition, and wherein a particular proposal associated with the particular license is generated;
said license update engine storing said proposals in said database;
said license update engine providing said proposals to one or more operators via a user interface, wherein the user interface:
highlights the determined conflict, the conflict being associated with the particular proposal, and
enables selection of an option to accept or ignore the particular proposal, wherein selection of the option to ignore the particular proposal causes the particular proposal to no longer be shown in a list of active proposals, and wherein acceptance of the particular proposal causes splitting of the particular license into two separate licenses; and said license update engine receiving from said one or more operators an option to accept said one or more proposals, wherein upon receiving acceptance of one or more proposals comprising, at least, the particular proposal, updating a corresponding computer configuration according to said accepted one or more proposals and causing splitting of the particular license.

2. The method of claim 1, further comprising:

one or more content libraries comprising archived collections of application, SKU, and license definitions;

said license update engine downloading content data and storing said data in a product database; and said license update engine providing one or more updates to customers for said content libraries in said product database.

3. The method of claim 1, further comprising:

one or more license definitions comprising one or more templates that define attributes and properties of a license entitlement from a software publisher, said license definition comprising basic properties, including license type, name, version and publisher, applications that are covered by the license, and use rights that the license grants, wherein said template is used to instantiate licenses.

4. The method of claim 1, further comprising:

one or more licenses, each license comprising an instance created from a license definition that represents a quantity of entitlements, from purchases associated with the license, for the installation and use of applications subject to a set of use rights.

5. The method of claim 1, further comprising:

one or more use rights comprising one or more terms in a license which affect how applications are entitled to be installed or used.

6. The method of claim 5, said use rights comprising any of:

a right of second use, in which installs on a desktop and a mobile computer owned by the same user count as one install;

a right of multiple use, in which all installs of an application on the same device count as one install; and virtualization rights, in which the application is either licensed per virtual machine or per host for many virtual machines.

7. The method of claim 1, further comprising: automatically running said license update engine as part of a batch process.

8. The method of claim 1, further comprising: said license update engine receiving one or more inputs from one or more operators to initiate said license update engine for a selected set of licenses to recalculate proposals for those licenses.

9. The method of claim 1, wherein the particular license is subsequently connected to a second license definition based on changed conditions since the time associated with the creation of the particular license.

10. An apparatus to increase accuracy of automatic license updates, said apparatus comprising:

one or more processors and non-transitory computer storage media storing instructions that when executed by the one or more processors, cause the one or more processors to perform operations, wherein the one or more processors are configured to communicate with a database comprising license definitions, licenses, and update proposals, said database configured to communicate with a server, and wherein the operations comprise:

identifying said licenses and said license definitions that are connected to said licenses, wherein a particular license is connected to a first license definition at a time associated with creation of the particular license, and wherein the particular license is subsequently connected to a second license definition;

periodically identifying updates to be applied to said definitions and to licenses that have drifted from their definition;

responsive to said identifying, generating one or more said license update proposals with regard to categories comprising license types, applications linked to licenses, and usage rights on licenses, where said proposals comprise one or more recommendations to change a setting or property associated with said categories to match its reference definition better, where each proposal is relative to a reference definition for the license, wherein a particular proposal associated with the particular license is generated, and wherein the particular proposal indicates a determined conflict between the first license definition and the second license definition;

storing said proposals in said database;

providing said proposals to one or more operators via a user interface, wherein the user interface:

highlights the determined conflict, and enables selection of an option to accept or ignore the particular proposal, wherein selection of the option to ignore the particular proposal causes the particular proposal to no longer be shown in a list of active proposals, and wherein acceptance of the particular proposal causes splitting of the particular license into two separate licenses; and receiving from said one or more operators an option to accept said one or more proposals, wherein upon receiving acceptance of one or more proposals comprising, at least, the particular proposal, updating a corresponding license configuration according to said accepted one or more proposals and causing splitting of the particular license.

11. The apparatus of claim 10, wherein the particular license is subsequently connected to a second license definition based on changed conditions since the time associated with the creation of the particular license.

12. Non-transitory computer storage media storing instructions that when executed by a system of one or more computers, cause the system to perform operations comprising:

identifying, via a database, licenses and license definitions that are connected to said licenses, wherein a particular license is connected to a first license definition at a time associated with creation of the particular license, and wherein the particular license is subsequently connected to a second license definition;

periodically identifying updates to be applied to said definitions and to licenses that have drifted from their definition;

responsive to said identifying, generating one or more license update proposals with regard to categories comprising license types, applications linked to licenses, and usage rights on licenses, where said proposals comprise one or more recommendations to change a setting or property associated with said categories to match its reference definition better, where each proposal is relative to a reference definition for the license, wherein a particular proposal associated with the particular license is generated, and wherein the particular proposal indicates a determined conflict between the first license definition and the second license definition;

storing said proposals in said database;

providing said proposals to one or more operators via a user interface, wherein the user interface:

highlights the determined conflict, and enables selection of an option to accept or ignore the particular proposal, wherein selection of the option to ignore the particular proposal causes the particular proposal to no longer be shown in a list of active proposals, and wherein acceptance of the particular proposal causes splitting of the particular license into two separate licenses; and receiving from said one or more operators an option to accept said one or more proposals, wherein upon receiving acceptance of one or more proposals comprising, at least, the particular proposal, updating a corresponding license configuration according to said accepted one or more proposals and causing splitting of the particular license.

\* \* \* \* \*